United States Patent
Nakao

(10) Patent No.: US 11,854,747 B2
(45) Date of Patent: Dec. 26, 2023

(54) STACKED CAPACITOR, CONNECTED CAPACITOR, INVERTER, AND ELECTRIC VEHICLE

(71) Applicant: KYOCERA Corporation, Kyoto (JP)

(72) Inventor: Yoshihiro Nakao, Kirishima (JP)

(73) Assignee: Kyocera Corporation, Kyoto (JP)

(*) Notice: Subject to any disclaimer, the term of this patent is extended or adjusted under 35 U.S.C. 154(b) by 288 days.

(21) Appl. No.: 17/439,588

(22) PCT Filed: Mar. 5, 2020

(86) PCT No.: PCT/JP2020/009462
§ 371 (c)(1),
(2) Date: Sep. 15, 2021

(87) PCT Pub. No.: WO2020/189312
PCT Pub. Date: Sep. 24, 2020

(65) Prior Publication Data
US 2022/0148810 A1    May 12, 2022

(30) Foreign Application Priority Data
Mar. 19, 2019 (JP) .................. 2019-051358

(51) Int. Cl.
*H01G 4/30* (2006.01)
*B60L 50/00* (2019.01)
(Continued)

(52) U.S. Cl.
CPC .............. *H01G 4/30* (2013.01); *B60L 50/00* (2019.02); *H01G 4/14* (2013.01); *H01G 4/228* (2013.01);
(Continued)

(58) Field of Classification Search
CPC .......... H01G 4/30; H01G 4/012; H01G 4/015; H01G 4/18; H01G 4/32; H01G 4/06;
(Continued)

(56) References Cited

U.S. PATENT DOCUMENTS

| | | | |
|---|---|---|---|
| 2008/0278888 A1* | 11/2008 | Yang | H01G 4/32 428/209 |
| 2012/0002346 A1* | 1/2012 | Takagaki | H01G 4/015 361/301.4 |

(Continued)

FOREIGN PATENT DOCUMENTS

| | | |
|---|---|---|
| JP | 2000-114089 A | 4/2000 |
| JP | 2015-153998 A | 8/2015 |

(Continued)

*Primary Examiner* — Michael P McFadden
(74) *Attorney, Agent, or Firm* — Volpe Koenig

(57) ABSTRACT

A stacked capacitor includes a body having opposing faces, first side faces in a first direction, and second side faces in a second direction. The body includes a first insulation margin without a first metal film and a second insulation margin without a second metal film. The first metal film includes a metal film edge overlapping the second insulation margin. The second metal film includes a metal film edge overlapping the first insulation margin. The first and second metal films each include multiple sub-films separated by multiple first slits. A first slit includes a first portion extending from the first or second insulation margin along the first side faces and a second portion located in the metal film edge and extending at an angle with the first side faces. The second portion has a length in the first direction greater than or equal to an interval between adjacent first slits.

7 Claims, 13 Drawing Sheets

(51) Int. Cl.
   *H01G 4/14* (2006.01)
   *H01G 4/228* (2006.01)
   *H01G 4/38* (2006.01)
   *H02P 27/06* (2006.01)

(52) U.S. Cl.
   CPC .............. *H01G 4/38* (2013.01); *H02P 27/06* (2013.01); *B60L 2220/46* (2013.01)

(58) Field of Classification Search
   CPC .......... H01G 4/005; H01G 4/224; H01G 4/38; H01G 4/14; H01G 4/228; H02M 7/5387; B60L 50/00; B60L 2220/46; H02P 27/06
   See application file for complete search history.

(56) References Cited

U.S. PATENT DOCUMENTS

| | | | |
|---|---|---|---|
| 2012/0218679 A1* | 8/2012 | Takeoka | H01G 4/012 361/311 |
| 2014/0301019 A1 | 10/2014 | Zhu et al. | |
| 2015/0138691 A1* | 5/2015 | Takeoka | H01G 4/18 361/304 |
| 2017/0047166 A1* | 2/2017 | Saito | H01G 4/32 |
| 2018/0277304 A1* | 9/2018 | Sano | H01G 4/015 |
| 2021/0134531 A1 | 5/2021 | Hiate et al. | |

FOREIGN PATENT DOCUMENTS

| | | |
|---|---|---|
| WO | 2013/082951 A1 | 6/2013 |
| WO | 2019/035457 A1 | 2/2019 |

* cited by examiner

STACKED CAPACITOR, CONNECTED CAPACITOR, INVERTER, AND ELECTRIC VEHICLE

FIELD

The present disclosure relates to a stacked capacitor, a connected capacitor, an inverter, and an electric vehicle.

BACKGROUND

A film capacitor includes, for example, a polypropylene resin film as a dielectric layer and a metal film deposited on the surface of the dielectric layer by vapor deposition. The metal film is used as an electrode. The film capacitor with this structure can have defective electrical insulation in the dielectric layer that may cause a short-circuit. In this case, the energy from the short-circuit causes a portion of the metal film around the defective portion to evaporate and diffuse to insulate the defective portion of the dielectric layer. Film capacitors have such self-healing properties and are unlikely to cause dielectric breakdown.

As described above, film capacitors are unlikely to ignite or to cause electric shocks upon short-circuiting of electrical circuitry. Thus, film capacitors are now increasingly used in, for example, power supply circuits for light-emitting diodes (LEDs), motor drives for hybrid vehicles, and inverter systems for photovoltaic power generation.

Film capacitors can be classified into wound capacitors and stacked capacitors. Stacked film capacitors are typically obtained by cutting from a stack of multiple dielectric layers and metal films. Cutting the dielectric layers and the metal films simultaneously causes the metal films to be exposed on each cut surface. To reduce insulation deterioration at the cut surface, a portion of the metal films at the cut position may be removed or the metal films may be sectioned for insulation at the cut surface (refer to Patent Literatures 1 and 2).

CITATION LIST

Patent Literature

Patent Literature 1: WO 2013/082951
Patent Literature 2: Japanese Unexamined Patent Application Publication No. 2015-153998

BRIEF SUMMARY

A stacked capacitor according to an aspect of the present disclosure includes a body and external electrodes on surfaces of the body. The body is a rectangular prism including one or more stacks each including a dielectric layer, a first metal film, and a second metal film. The first metal film and the second metal film face each other across the dielectric layer. The body has a pair of opposing faces located in a thickness direction of the dielectric layer, a pair of opposing first side faces connecting the pair of opposing faces, and a pair of opposing second side faces receiving the external electrodes. The first side faces are located in a first direction, and the external electrodes are located in a second direction. The body includes an active area in which the first metal film and the second metal film overlap each other across the dielectric layer, a first insulation margin in which a portion without the first metal film extends continuously in the first direction, and a second insulation margin in which a portion without the second metal film extends continuously in the first direction. The first metal film includes a metal film edge in the second insulation margin. The second metal film includes a metal film edge in the first insulation margin. The first metal film includes a plurality of sub-films separated from one another by a plurality of first slits, and the second metal film includes a plurality of sub-films separated from one another by a plurality of first slits. A first slit of the plurality of first slits includes a first portion extending from the first insulation margin or the second insulation margin along the first side faces and across the active area and a second portion located in the metal film edge and extending at an angle with the first side faces. The second portion has a length in the first direction greater than or equal to an interval between adjacent first slits of the plurality of first slits. The second portion at the metal film edge of the first metal film extends from a first end of the second portion connecting with the first portion to a second end in a direction opposite to a direction in which the second portion at the metal film edge of the second metal film extends from a first end of the second portion connecting with the first portion to a second end.

A connected capacitor according to another aspect of the present disclosure includes a plurality of capacitors, and a busbar electrically connecting the plurality of capacitors. The plurality of capacitors include the above stacked capacitor.

An inverter according to another aspect of the present disclosure includes a bridge circuit including a switching element, and an active area connected to the bridge circuit. The active area includes the above stacked capacitor.

An electric vehicle according to another aspect of the present disclosure includes a power supply, an inverter connected to the power supply, a motor connected to the inverter, and a wheel drivable by the motor. The inverter includes the above inverter.

BRIEF DESCRIPTION OF DRAWINGS

The objects, features, and advantages of the present disclosure will become more apparent from the following detailed description and the drawings.

DETAILED DESCRIPTION

Figure 1:
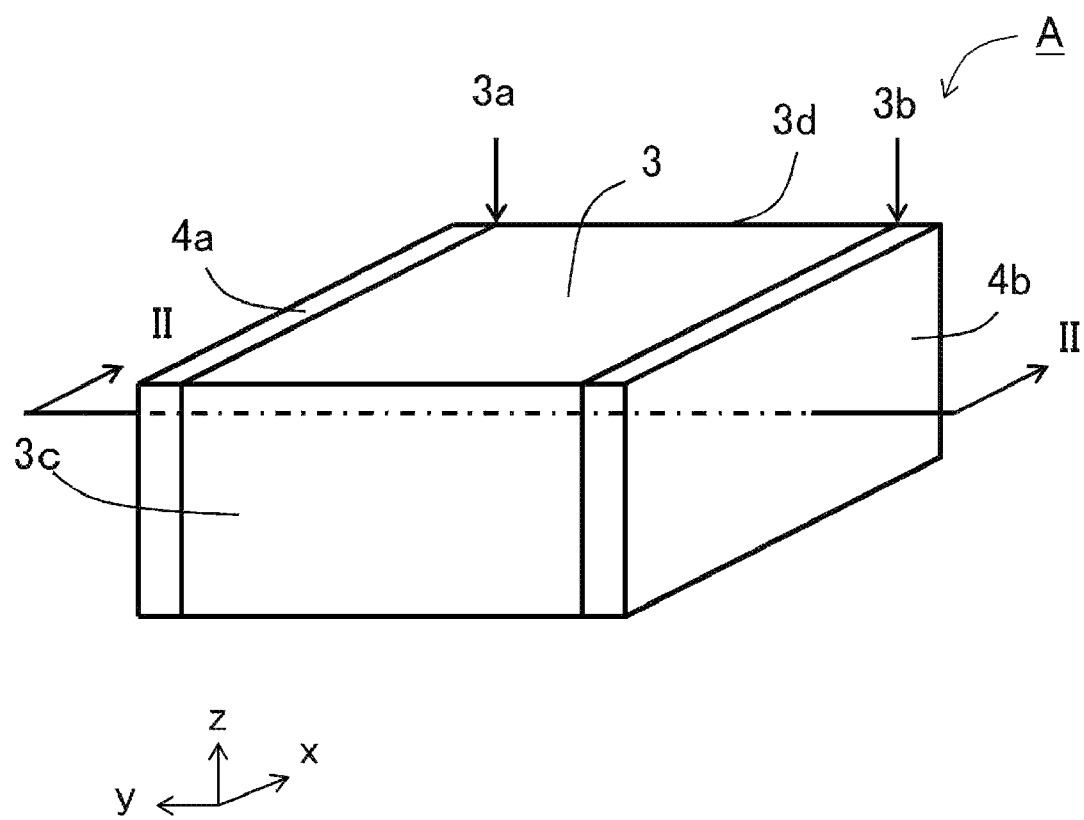
FIG. 1 is a perspective view of a stacked capacitor.
Figure 2:
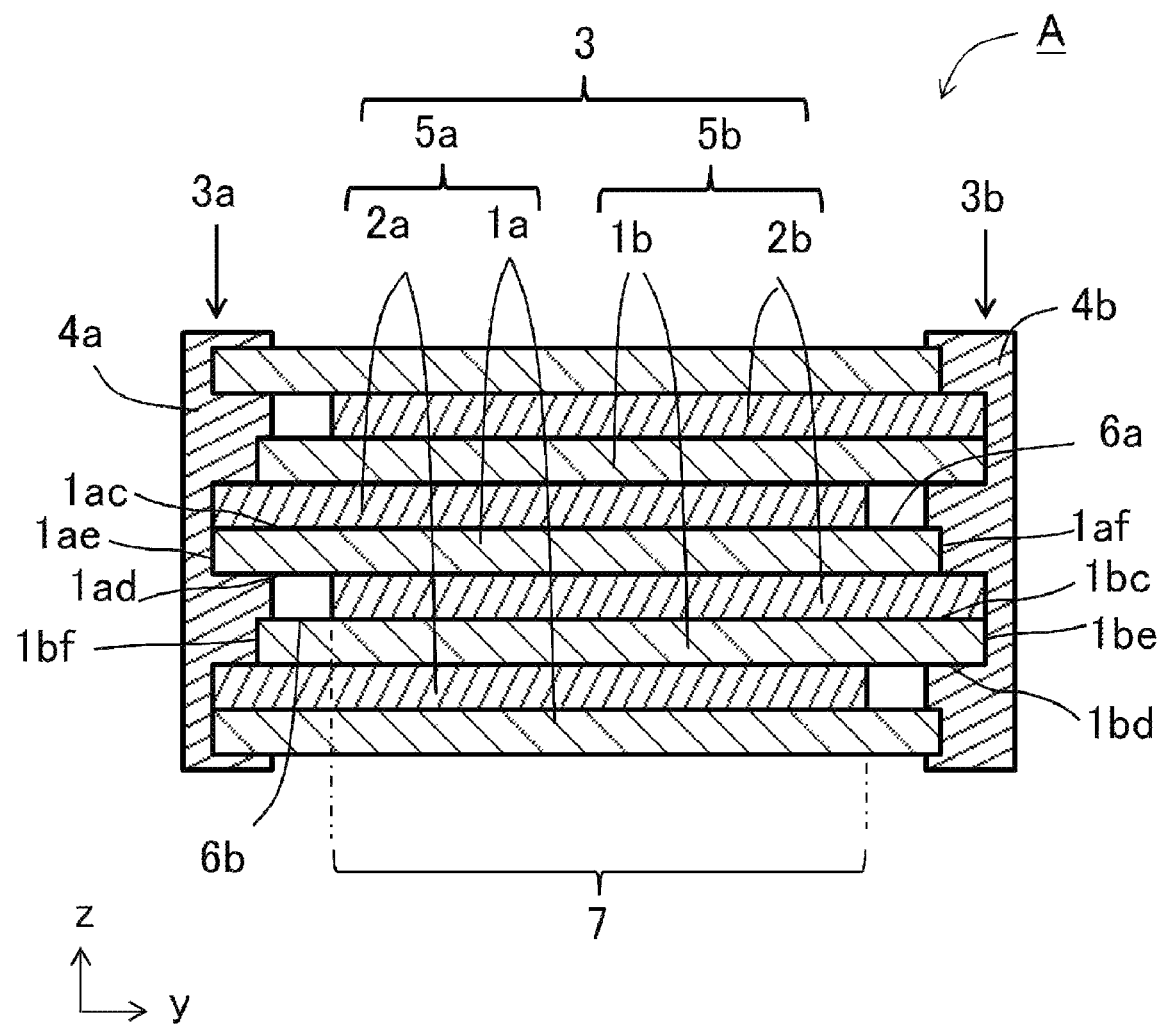
FIG. 2 is a cross-sectional view of a stacked capacitor in an example, taken along line II-II in FIG. 1.

As shown in FIGS. 1 and 2, a stacked capacitor includes a body 3 and a pair of first and second external electrodes 4a and 4b. The body 3 includes one or more stacks of a first dielectric layer 1a, a first metal film 2a, a second dielectric layer 1b, and a second metal film 2b. The body 3 is a rectangular prism having a pair of opposing faces located in the stacking direction, a pair of opposing first side faces 3c and 3d connecting the pair of faces in the stacking direction, and a pair of opposing second side faces 3a and 3b. The first and second external electrodes 4a and 4b are formed on the second side faces 3a and 3b as metallic contact parts. The opposing first side faces 3c and 3d of the body 3 are free of external electrodes. The first and second external electrodes 4a and 4b may be simply referred to as external electrodes 4.

As shown in FIG. 2, the body 3 in a stacked capacitor A includes first metallized layers 5a and second metallized layers 5b alternately stacked on each other. Each first metallized layer 5a includes the first metal film 2a on a first surface 1ac of the first dielectric layer 1a. Each second metallized layer 5b includes the second metal film 2b on a first surface 1bc of the second dielectric layer 1b. The first metal film 2a is electrically connected to the first external electrode 4a at the second side face 3a of the body 3. The second metal film 2b is electrically connected to the second external electrode 4b at the second side face 3b of the body 3. As shown in FIG. 1, a first direction x refers to the direction in which the first side faces 3c and 3d free of external electrodes are arranged, and a second direction y refers to the direction in which the first external electrode 4a and the second external electrode 4b are arranged. A third direction z refers to the thickness direction of the first dielectric layers 1a and the second dielectric layers 1b. The third direction z is also the direction in which the first dielectric layer 1a and the second dielectric layer 1b are stacked.

FIG. 2 is a cross-sectional view taken along line II-II in FIG. 1. In FIG. 2, the first direction x is the longitudinal direction of the first dielectric layer 1a, the second dielectric layer 1b, the first metal film 2a, and the second metal film 2b. The second direction y is the width direction of the films and layers. The third direction z is the thickness direction of the films and layers.

The first dielectric layer 1a in the stacked capacitor A has the first surface 1ac and a second surface 1ad intersecting with the third direction z, and a first side surface 1ae and a second side surface 1af intersecting with the second direction y. The second dielectric layer 1b has the first surface 1bc and a second surface 1bd intersecting with the third direction z, and a first side surface 1be and a second side surface 1bf intersecting with the second direction y.

The first metallized layer 5a includes the first dielectric layer 1a and the first metal film 2a located on the first surface 1ac of the first dielectric layer 1a. The first metallized layer 5a has a first insulation margin 6a on the first surface 1ac adjacent to the second side surface 1af. The first insulation margin 6a includes an uncovered portion of the first dielectric layer 1a extending continuously in the first direction x.

The second metallized layer 5b includes the second dielectric layer 1b and the second metal film 2b located on the first surface 1bc of the second dielectric layer 1b. The second metallized layer 5b has a second insulation margin 6b on the first surface 1bc adjacent to the second side surface 1bf. The second insulation margin 6b includes an uncovered portion of the second dielectric layer 1b extending continuously in the first direction x.

As shown in FIG. 2, the metallized layers 5a and 5b are stacked on each other with a slight deviation from each other in the second direction y, which is the width direction. One or more sets of the metallized layers 5a and 5b are stacked in the third direction z.

A potential difference across the first metal film 2a and the second metal film 2b causes capacitance charging in an active area 7 in which the first metal film 2a and the second metal film 2b overlap each other across the first dielectric layer 1a or the second dielectric layer 1b.

The stacked capacitor A described above is obtained in the manner described below. The first metallized layer 5a and the second metallized layer 5b both in an elongated shape are stacked on each other with a slight deviation from each other in the second direction y or the width direction. This forms a stack. The external electrode 4a is formed on the second side face 3a in the second direction y of the resultant stack, and the second external electrode 4b is formed on the second side face 3b. The stack including the first external electrode 4a and the second external electrode 4b is cut at predetermined intervals in the first direction x into individual stacked capacitors A. After the stack is cut, the external electrodes 4 may be formed on each body 3.

Figure 3:
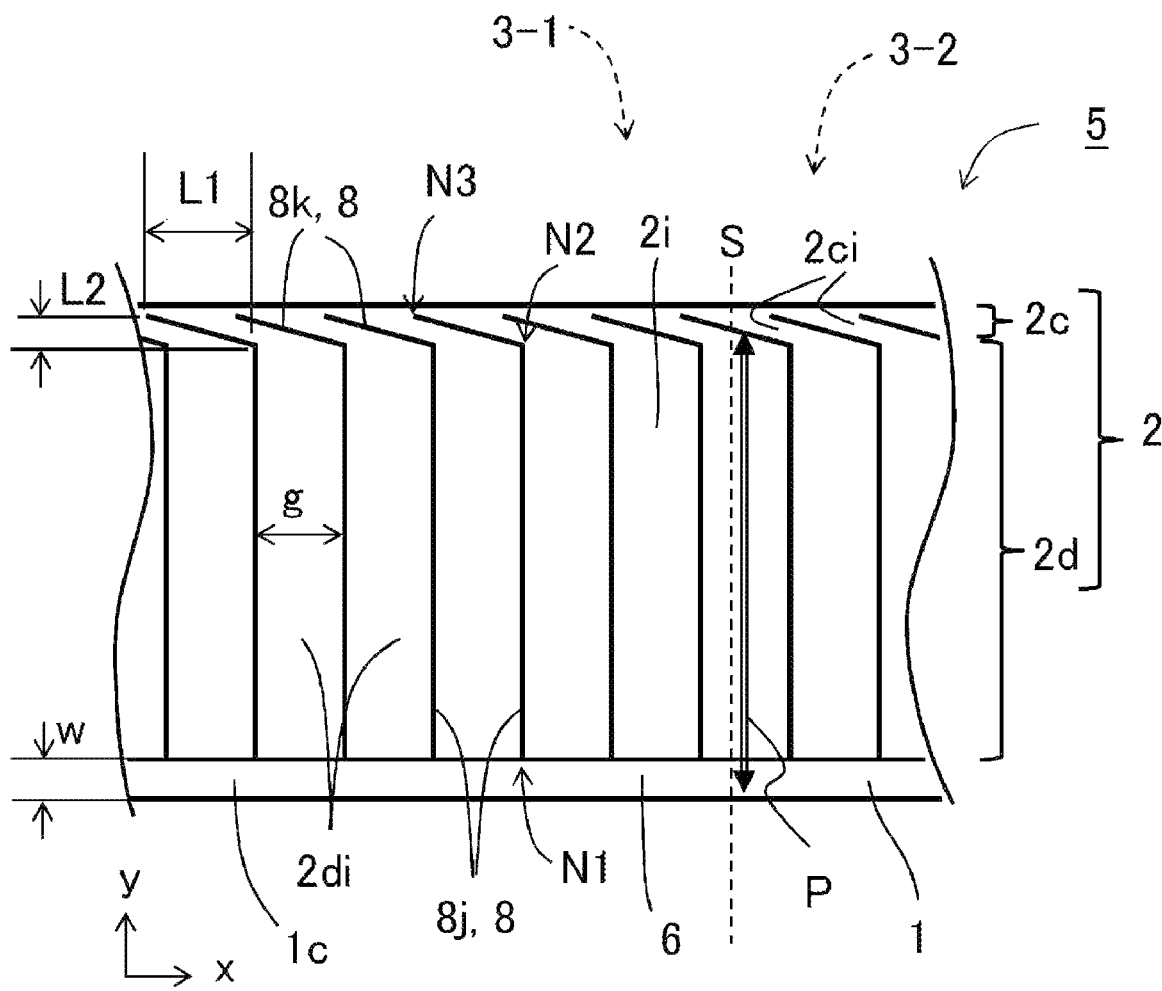
FIG. 3 is a plan view of a metallized layer in an example.

The characteristic parts commonly of the first metallized layers 5a and the second metallized layers 5b in the stacked capacitor A according to one or more embodiments will be described below. In FIG. 3, the components may be simply referred to as a dielectric layer 1, a metal film 2, or a metallized layer 5 without the reference signs a and b.

FIG. 3 shows the metallized layer 5 in an example. The metallized layer 5 includes the dielectric layer 1 and the metal film 2 located on a first surface 1c of the dielectric layer 1. The first surface 1c of the dielectric layer 1 has an insulation margin 6 uncovered with the metal film 2. The metal film 2 has a portion 2d located in the active area 7 and adjacent to the insulation margin 6 and a metal film edge 2c located opposite to the insulation margin 6 adjacent to the portion 2d. The metal film 2 includes multiple sub-films 2i separated from one another by multiple first slits 8.

Each first slit 8 has a first portion 8j extending from a first end N1 in contact with the insulation margin 6 along the first side faces 3c and 3d across the active area 7, and a second portion 8k located in the metal film edge 2c and extending at an angle with the first side faces 3c and 3d.

In other words, the first portion 8j of the first slit 8 extends in the second direction y, and the second portion 8k extends at an angle with the second direction y. With the body 3 being a rectangular prism, the second portion 8k also extends at an angle with the first direction x. The first portion 8j extending along the first side face 3c and 3d or in the second direction y refers to the first portion 8j forming an angle of 15° or less with the first side faces 3c and 3d or the second direction y. The first portion 8j may form an angle of 0° with the first side faces 3c and 3d or the second direction y. The second portion 8k extending at an angle with the first side face 3c and 3d or in the second direction y refers to the second portion 8k forming an angle greater than 15° with the first side faces 3c and 3d or the second direction y. The second portion 8k may form an angle less than 75° with the first side faces 3c and 3d or the second direction y.

In the second direction y, the first portion 8j of the first slit 8 has a second end N2 opposite to the first end N1. The second portion 8k has an end nearer the active area 7 matching the second end N2 and a third end N3 away from the active area 7. The second end N2 connects the first portion 8j and the second portion 8k.

In FIG. 3, each sub-film 2i includes a strip-shaped first sub-film 2di extending along the first side faces 3c and 3d in the active area 7 and a strip-shaped second sub-film 2ci extending at an angle with the first side faces 3c and 3d at an end of the sub-film 2i opposite to the insulation margin 6.

The first portion 8j of the first slit 8 may extend further to the metal film edge 2c from the portion 2d located in the active area 7. The second portion 8k located in the metal film edge 2c does not extend to the portion 2d in the active area 7. In other words, the second portion 8k has its second end N2 and third end N3 both at the metal film edge 2c.

The second portion 8k has a length L1 in the first direction x and a length L2 in the second direction y. The length L1 is equal to or greater than an interval g between adjacent first slits 8 in the first direction x.

Figure 4:
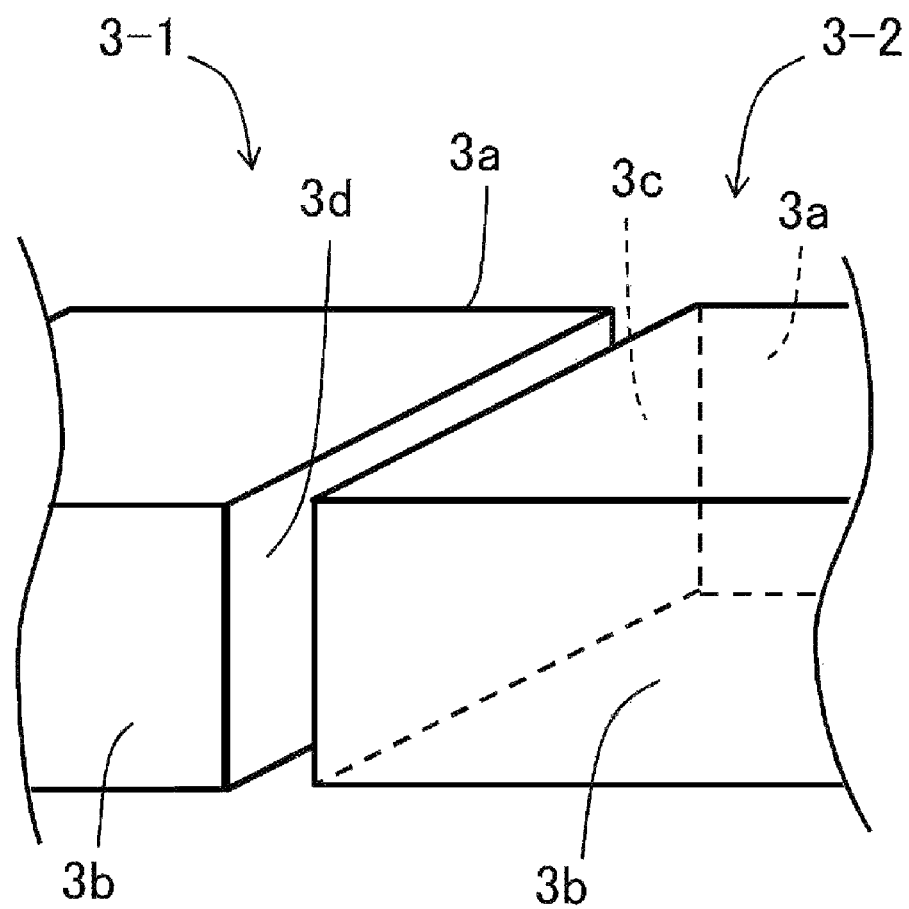
FIG. 4 is a perspective view of a stack showing the cut portion.

For example, the metal film 2 may be cut in the second direction y along the broken line S as shown in FIG. 3. FIG. 4 is a perspective view of two bodies 3-1 and 3-2 obtained by cutting a stack. The stack in FIG. 4 contains the metal film 2 shown in FIG. 3. The body 3-1 in the left part of FIG. 4 has the first side face 3d on the cut surface, and the body 3-2 in the right part of FIG. 4 has the first side face 3c on its cut surface.

As shown in FIG. 3, a portion of the metal film 2 on the left of the broken line S or a cut section S is located on the first side face 3d of the body 3-1, and a portion of the metal film 2 on the right of the cut section S is located on the first side face 3c of the body 3-2. In FIG. 3, when the second portion 8k of the first slit 8 having the length L1 in the first direction x is greater than or equal to the interval g between adjacent first slits 8, the first sub-film 2di in the active area 7 and on the right of the cut section S in the active area 7 is insulated from the external electrodes 4, independently of the position of the cut section S. In FIG. 3, the double line arrows indicate the portion P of the metal film 2 insulated from the external electrodes 4 on the cut section S.

Figure 5:
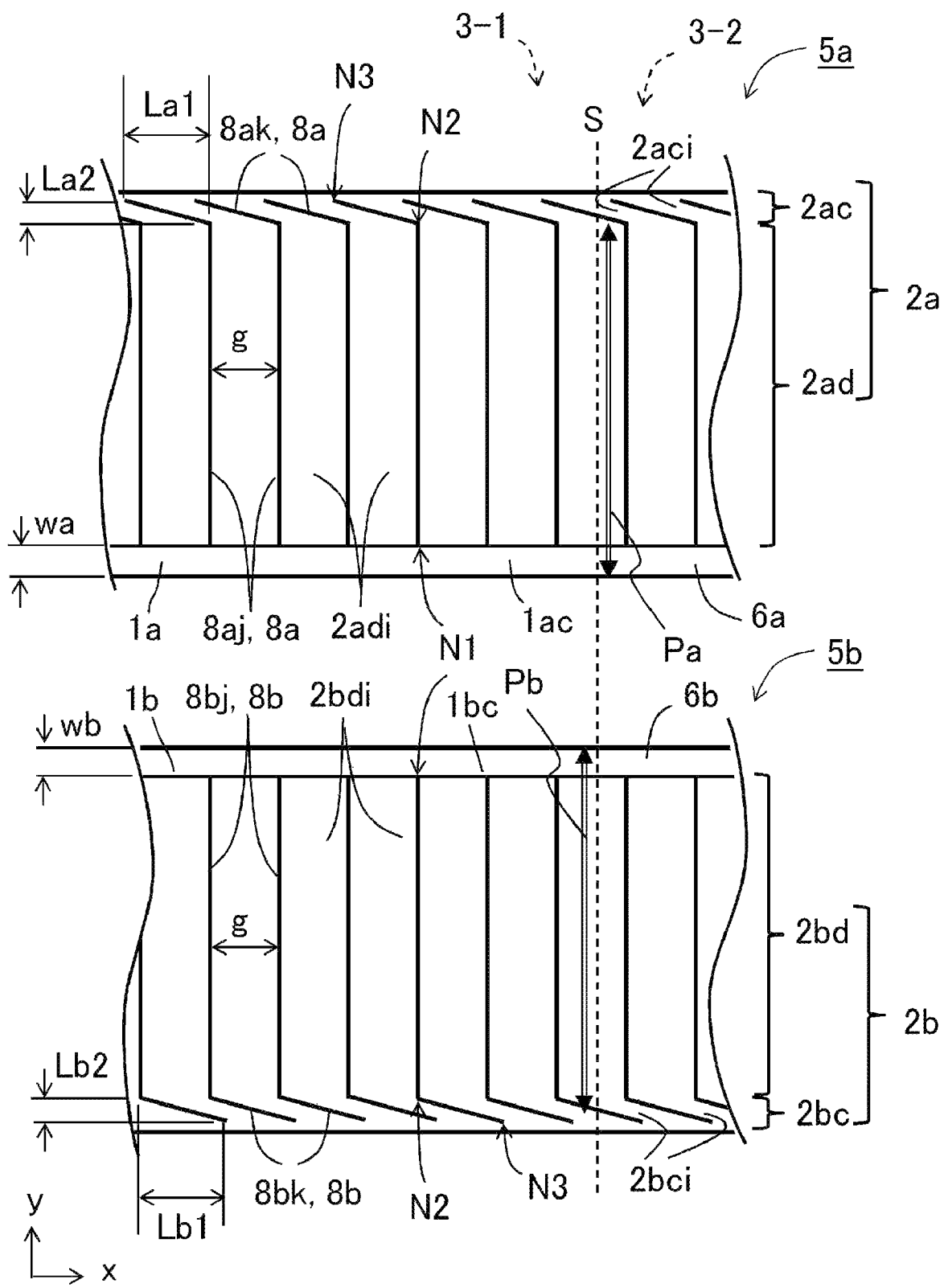
FIG. 5 is a plan view of a first metal film and a second metal film showing their arrangement.

FIG. 5 is a diagram describing the arrangement of first slits 8a in the first metal film 2a and first slits 8b in the second metal film 2b. The first metallized layer 5a shown in the upper part of FIG. 5 and the second metallized layer 5b shown in the lower part of FIG. 5 are stacked on each other with a slight deviation from each other in the second direction y. One or more sets of the metallized layers are stacked on one another as shown in FIG. 2. The portion 2ad of the first metal film 2a and the portion 2bd of the second metal film 2b overlap each other across the first dielectric layer 1a or the second dielectric layer 1b, forming the active area 7. The metal film edge 2ac of the first metal film 2a overlaps the second insulation margin 6b of the second metallized layer 5b. The metal film edge 2bc of the second metal film 2b overlaps the first insulation margin 6a of the first metallized layer 5a.

As shown in FIG. 5, the second portion 8ak of the first metal film 2a extends from the second end N2 to the third end N3 in a direction opposite to the direction in which the second portion 8bk of the second metal film 2b extends from the second end N2 to the third end N3. In other words, in the first direction x, the second portion 8ak of the first metal film 2a extends from the second end N2 to the third end N3 in a direction opposite to the direction in which the second portion 8bk of the second metal film 2b extends from the second end N2 to the third end N3. The second portion 8ak extending from the second end N2 to the third end N3 in a direction opposite to the direction in which the second portion 8bk extends from the second end N2 to the third end N3 may be simply referred as the second portion 8ak and the second portion 8bk extending in opposite directions.

In FIG. 5, the second portion 8ak of the first metal film 2a and the second portion 8bk of the second metal film 2b extend in the opposite directions. In this case, the first metal film 2a has a portion indicated by the double line arrows Pa insulated from the external electrode 4a, and the second metal film 2b has a portion indicated by the double line arrows Pb insulated from the external electrode 4b. The double line arrows Pa indicate a portion of the first metal film 2a on the right of the cut section S, or more specifically a portion including the first sub-films 2adi located in the active area 7 in the body 3-2. The double line arrows Pb indicate a portion of the second metal film 2b on the left of cut section S, or more specifically a portion including the first sub-films 2bdi located in the active area 7 in the body 3-1. Hereafter, the double line arrows P may be simply referred to as arrows P, the double line arrows Pa may be as arrows Pa, and the double line arrows Pb may be as arrows Pb.

On the first side face 3d of the body 3-1 on the left of the cut section S, the first sub-film 2adi facing the first side face 3d of the first metal film 2a and in the active area 7 is electrically connected to the external electrode 4a through the second sub-film 2aci. The first sub-film 2bdi facing the first side face 3d of the second metal film 2b and in the active area 7 is included in the portion indicated by the arrows Pb and insulated from the external electrode 4b. On the first side face 3c of the body 3-2 on the right of the cut section S, the first sub-film 2adi facing the first side face 3d of the first metal film 2a and in the active area 7 is included in the portion indicated by the arrows Pa and electrically insulated from the external electrode 4a. The first sub-film 2bdi facing the first side face 3c of the second metal film 2b and in the active area 7 is electrically connected to the external electrode 4b through the second sub-film 2bci.

Thus, on the first side faces 3c and 3d, either the first sub-film 2adi or the first sub-film 2bdi facing the first side face 3c or 3d and in the active area 7 is electrically insulated from the external electrode 4a or 4b. With either the first sub-film 2adi or the first sub-film 2bdi being electrically insulated from the external electrode 4a or 4b on the first side face 3c or 3d, any contact between the first sub-film 2adi and the first sub-film 2bdi on the first side face 3c or 3d does not increase the insulation deterioration on the first side faces 3c and 3d.

The third end N3 may be aligned with the first side surface 1ae of the dielectric layer 1 in the second direction y. The metal film 2 may include a portion extending continuously in the first direction x from the third end N3 to the first side surface 1ae.

The length L1 of the second portion 8k of each first slit 8 in the first direction x may be less than or equal to three times the interval g between adjacent first slits 8. The first sub-film 2di electrically insulated from the external electrodes 4 does not contribute to capacitance charging near the first side faces 3c and 3d. When the first sub-film 2di, not contributing to capacitance charging, has a large area, the stacked capacitor A has a smaller capacitance. With the length L1 being less than or equal to three times the interval g, the area of the first sub-film 2di not contributing to capacitance charging can be smaller. The stacked capacitor A can thus have a larger capacitance.

The second portion 8k of each first slit 8 in the second direction y may have a length L2 less than the width w of the insulation margin 6. More specifically, the second portion 8ak of each first slit 8a in the first metal film 2a in the second direction y may have a length La2 less than the width wb of the second insulation margin 6b of the second metallized layer 5b. The second portion 8bk of each first slit 8b in the second metal film 2b in the second direction y may have a length Lb2 less than the width wa of the first insulation margin 6a of the first metallized layer 5a.

The first metallized layer 5a and the second metallized layer 5b are stacked on each other with a slight deviation from each other in the second direction y. The length La2 may be less than or equal to the width wb. The length Lb2 may be less than or equal to the width wa. The length La2 is less than the sum of the width wb and the deviation width. The length Lb2 is less than the sum of the width wa and the deviation width. With the length La2 being less than the sum of the width wb and the deviation width, the second sub-film 2aci electrically connected to the external electrode 4a entirely overlaps the second insulation margin 6b but has no overlap with the second metal film 2b in the third direction z. Thus, the second sub-film 2aci and the second metal film 2b are less likely to be in contact with each other on the cut surface S or on the first side faces 3c and 3d. With the length Lb2 being less than the sum of the width wa and the deviation width, the second sub-film 2bci electrically connected to the external electrode 4a entirely overlaps the first insulation margin 6a but has no overlap with the first metal film 2a in the third direction z. Thus, the second sub-film 2bci and the first metal film 2a are less likely to be in contact with each other on the cut surface S or on the first side faces 3c and 3d.

Each first sub-film 2di may include multiple small sections electrically connected with fuses 10 in the active area 7. In the example shown in FIG. 6, the first sub-film 2di defined by the first slits 8 is divided into the small sections by multiple second slits 9 extending intermittently in the first direction x. Small sections adjacent to each other in the second direction y are electrically connected with a fuse 10 located between adjacent second slits 9 in the first direction x. Each second slit 9 may be at 0° with the first direction x. Each second slit 9 may be at 45° or less than 45° with the first direction x.

Figure 6:
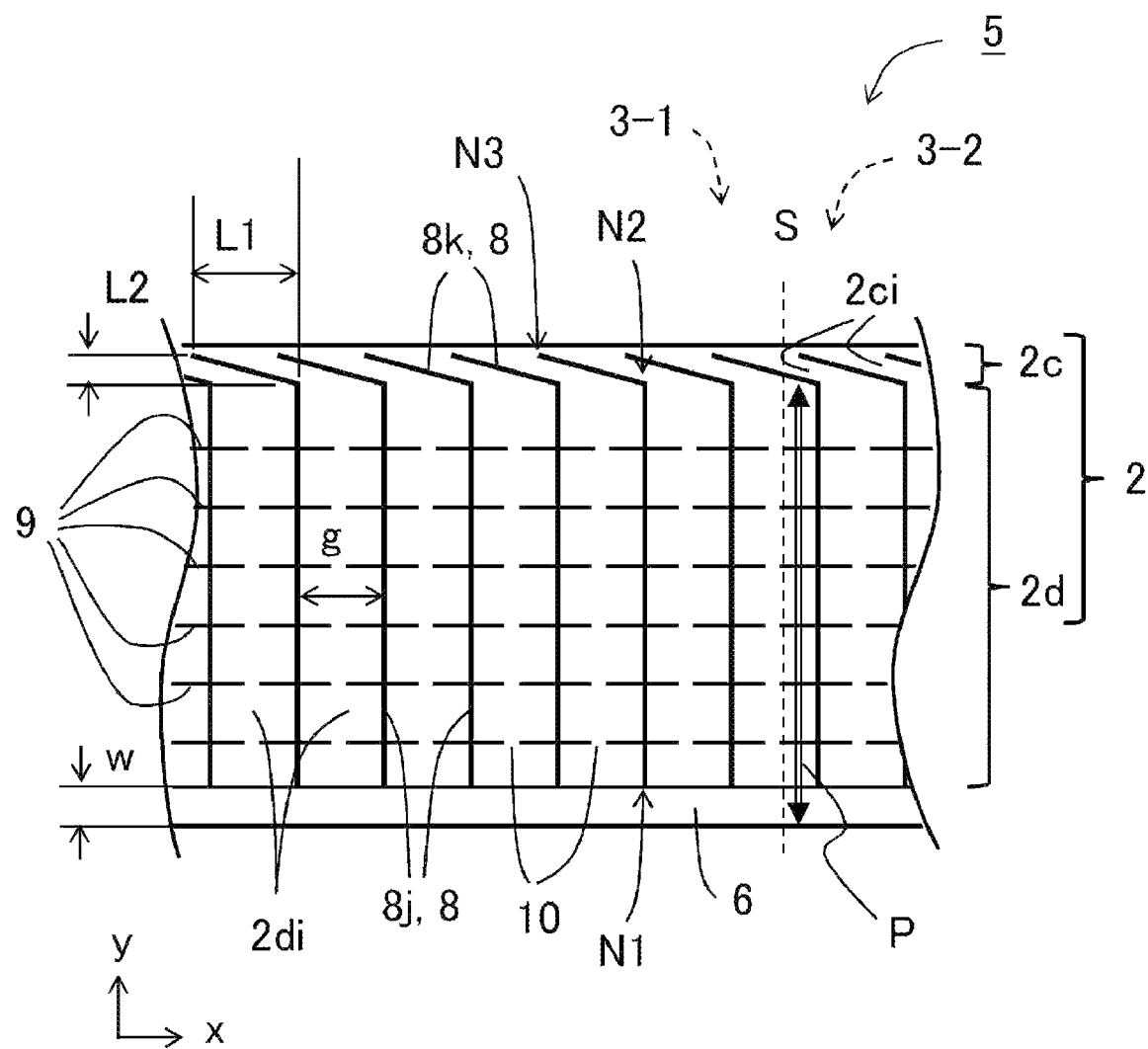
FIG. 6 is a plan view of a metallized layer in an example.

The arrangement shown in FIGS. 3, 5, and 6 may be reversed laterally.

Figure 7:
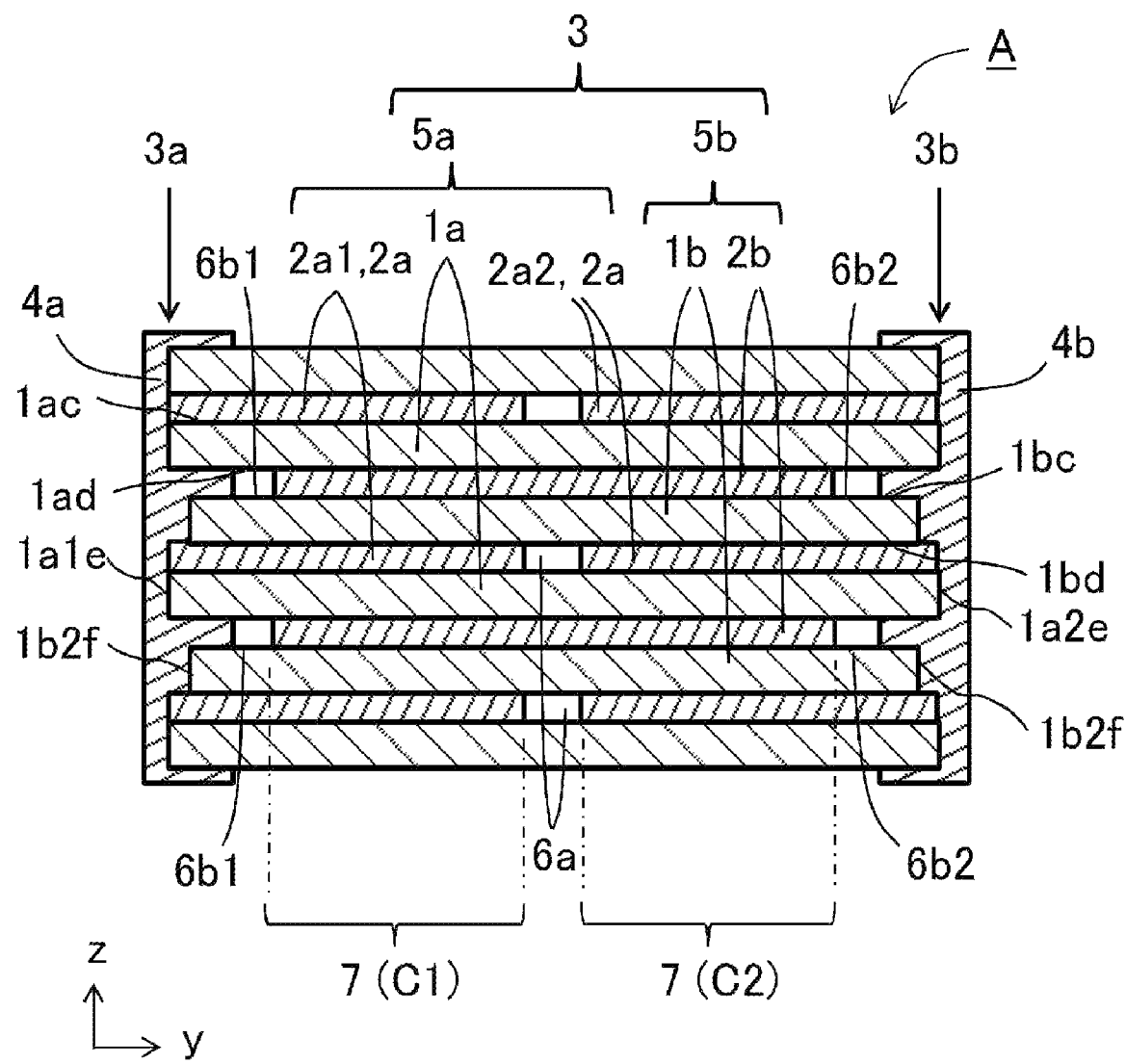
FIG. 7 is a cross-sectional view of a stacked capacitor in an example, taken along line II-II in FIG. 1.

FIG. 7 is a cross-sectional view of a series-connected stacked capacitor A in an example. In FIG. 7, the body 3 includes two capacitor units, or a first capacitor unit C1 and a second capacitor unit C2 connected in series.

Each first metal film 2a includes a first metal film 2a1 shown in the left part of FIG. 7 and a first metal film 2a2 shown in the right part of FIG. 7. More specifically, the first metal film 2a includes the first metal film 2a1 and the first metal film 2a2 arranged in the second direction y. The first metal film 2a1 is electrically connected to the first external electrode 4a at the second side face 3a of the body 3 on the left. The first metal film 2a2 is electrically connected to the second external electrode 4b at the second side face 3b of the body 3 on the right.

Each first metallized layer 5a has, in its middle portion in the second direction y, a first insulation margin 6a extending continuously in the first direction x. The first insulation margin 6a is a portion of the first dielectric layer 1a in which the first surface lac is uncovered with a metal film. The first metal films 2a1 and 2a2 are electrically insulated from each other by the first insulation margin 6a.

Each second metallized layer 5b has, on its two ends in the second direction y, second insulation margins 6b1 and 6b2 that extend continuously in the first direction x. The second insulation margins 6b1 and 6b2 are portions of the second dielectric layer 1b in which the first surface 1bc is uncovered with a metal film. The second metal film 2b is not electrically connected to the first external electrode 4a or the second external electrode 4b.

As shown in FIG. 7, one or more sets of the first metallized layer 5a and the second metallized layer 5b are stacked on one another in the third direction z.

The series-connected stacked capacitor A includes the first capacitor unit C1 and the second capacitor unit C2 connected in series. The first capacitor unit C1 is located in a portion of the active area 7 in which the first metal film 2a1 and the second metal film 2b are stacked across the dielectric layer 1a or 1b. The second capacitor unit C2 is located in a portion of the active area 7 in which the first metal film 2a2 and the second metal film 2b are stacked across the dielectric layer 1a or 1b.

Figure 8:
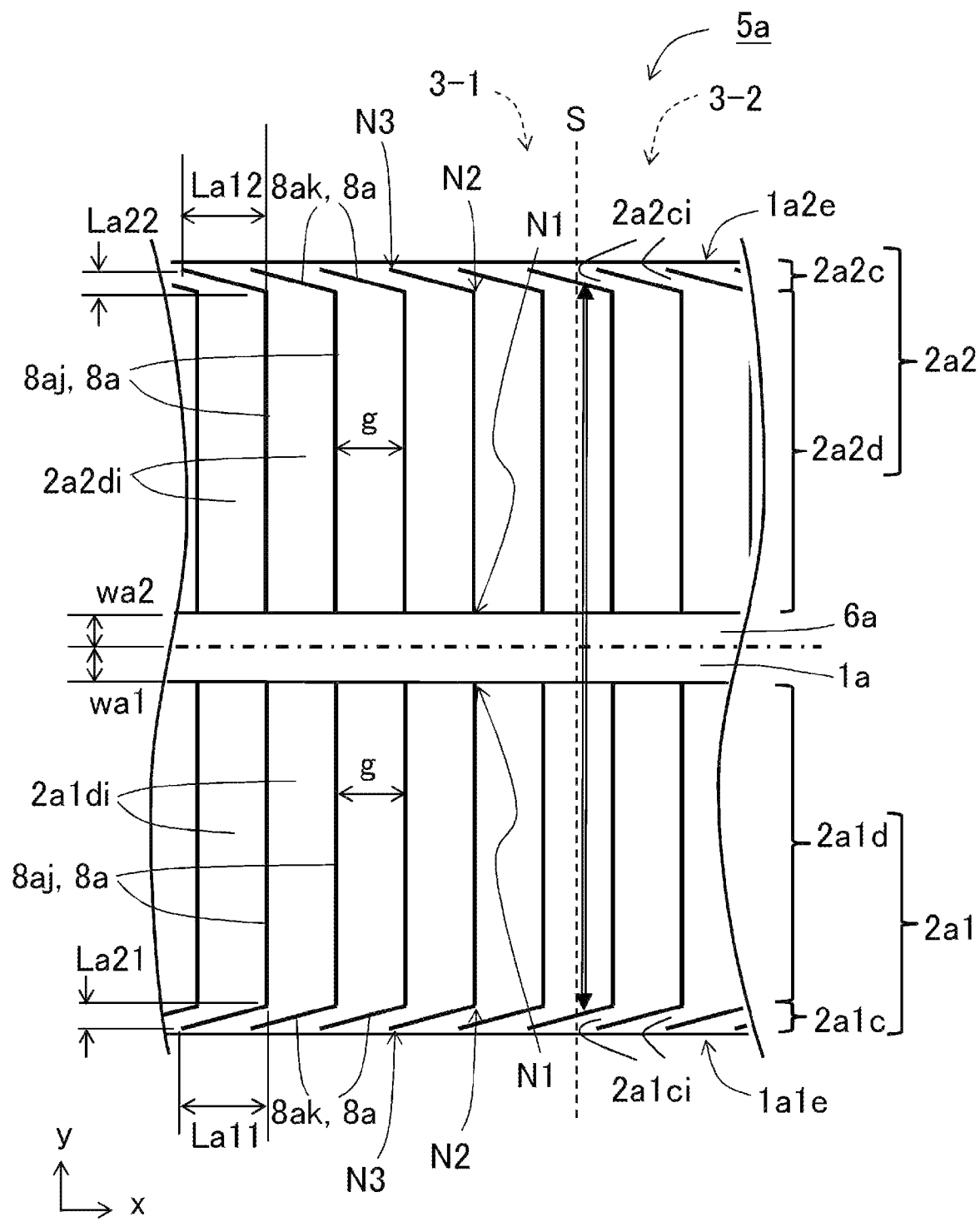
FIG. 8 is a plan view of a first metallized layer in an example, used in the stacked capacitor in FIG. 7.

FIG. 8 shows a first metallized layer 5a in an example. In the series-connected stacked capacitor A, the first metallized layer 5a includes the first metal film 2a1 shown in the lower part from the dot-and-dash line in FIG. 8 and the first metal film 2a2 shown in the upper part from the dot-and-dash line in FIG. 8. The first metal film 2a1 includes a portion 2a1d located adjacent to the first insulation margin 6a and in the active area 7 and a metal film edge 2a1c located at the end of the portion 2a1d opposite to the first insulation margin 6a. The first metal film 2a2 includes a portion 2a2d located adjacent to the first insulation margin 6a and in the active area 7 and a metal film edge 2a2c located at the end of the portion 2a2d opposite to the first insulation margin 6a. In FIG. 8, the width wa1 or wa2 of the first insulation margin 6a in the first capacitor unit C1 or the second capacitor unit C2 is half the distance between the first metal film 2a1 and the first metal film 2a2.

Figure 9:
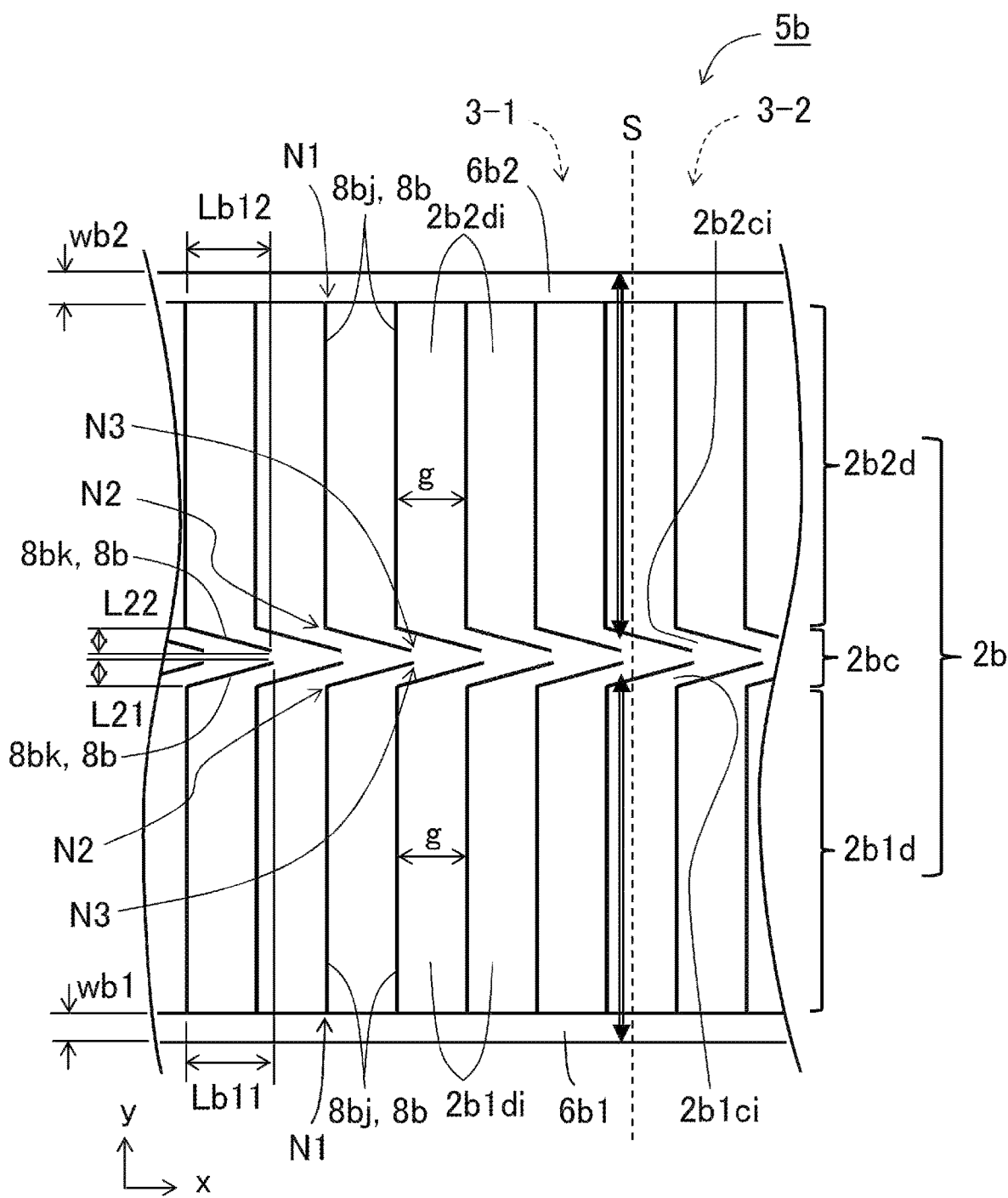
FIG. 9 is a plan view of a second metallized layer in an example, used in the stacked capacitor in FIG. 7.

FIG. 9 shows a second metallized layer 5b in an example, corresponding to the first metallized layer 5a in FIG. 8. The second metal film 2b includes a portion 2b1d located adjacent to the second insulation margin 6b1 and in the active area 7 as shown in the lower part of FIG. 9, a portion 2b2d located adjacent to the second insulation margin 6b2 and in the active area 7 as shown in the upper part of FIG. 9, and a metal film edge 2bc located between the portion 2b1d and the portion 2b2d. In other words, the metal film edge 2bc is located at the end of the portion 2b1d opposite to the second insulation margin 6b1 and at the end of the portion 2b2d opposite to the second insulation margin 6b2. For ease of explanation, although the metal film edge 2bc is located in the middle of the second metallized layer 5b in the second direction y in FIG. 9, the position is referred to as, for ease of explanation, a metal film edge.

The series-connected stacked capacitor A may have the portions 2a1d, 2a2d, 2b1d, and 2b2d and the metal film edges 2a1c, 2a2c, and 2bc arranged in the same manner as in the first slit 8 described above. This enhances the insulation at the first side faces 3c and 3d or the cut section. More specifically, the first metal films 2a1 and 2a2 and the second metal film 2b each include the second portion 8k with a length La11, La12, Lb11, or Lb12 in the first direction x greater than or equal to the interval g between adjacent first slits 8 in the first direction x. The second portion 8ak of the first slit 8a in the first metal film 2a1 forming the first capacitor unit C1 and the second portion 8bk of the first slit 8b in the second metal film 2b extend in opposite directions, and the second portion 8ak of the first slit 8a in the first metal film 2a2 forming the second capacitor unit C2 and the second portion 8bk of the first slit 8b in the second metal film 2b extend in opposite directions.

More specifically, in the first metal film 2a1 and the second metal film 2b forming the first capacitor unit C1, the first metal film 2a1 extends in the first direction x from the second end N2 to the third end N3 in a direction opposite to the direction in which the second metal film 2b extends from the lower second end N2 to the lower third end N3. In the first metal film 2a2 and the second metal film 2b forming the second capacitor unit C2, the first metal film 2a2 extends from the second end N2 to the third end N3 in the direction opposite to the direction in which the second metal film 2b extends from the upper second end N2 to the upper third end N3.

The third end N3 of the first metal film 2a1 may be aligned with the first side surface 1a1e of the first dielectric layer 1a in the second direction y. The third end N3 of the first metal film 2a2 may be aligned with the first side surface 1a2e of the first dielectric layer 1a in the second direction y. In this case, the second sub-films 2a1ci and 2a2ci are electrically connected to the external electrodes 4. The first metal film 2a1 may include a portion extending continuously in the first direction x from the third end N3 to the first side surface 1a1e. The first metal film 2a2 may include a portion extending continuously in the first direction x from the third end N3 to the first side surface 1a2e. In this case, the portion of each metal film extending continuously in the first direction x is electrically connected to the corresponding external electrode 4.

As shown in FIG. 9, the second metal film 2b may or may not include, from the second sub-films 2b1ci to the second sub-films 2b2ci, a portion extending continuously in the first direction x without being separated by slits.

In the example shown in FIGS. 8 and 9, the first metal film 2a1 extends, in the first direction x, from the second end N2 to the third end N3 in the same direction as the first metal film 2a2. The first metal film 2a1 may extend, in the first direction x, from the second end N2 to the third end N3 in the direction opposite to the direction in which the first metal film 2a2 extends from the second end N2 to the third end N3. The second metal film 2b may extend, in the first direction x, from the upper second end N2 to the upper third end N3 in a direction opposite to the direction in which the second metal film 2b extends from the lower second end N2 to the lower third end N3.

The dielectric layers 1 in the stacked capacitor A may include resin films. In other words, the stacked capacitor A may be a stacked film capacitor including resin films as the dielectric layers 1. Examples of insulating materials for the dielectric layers 1 in the film capacitor include polypropylene (PP), polyethylene terephthalate (PET), polyphenylene sulfide (PPS), polyethylene naphthalate (PEN), polyarylate (PAR), polyphenylene ether (PPE), polyetherimide (PEI), and cycloolefin polymers (COP). In particular, polyarylate (PAR) has a high dielectric breakdown voltage.

The resin films may have an average thickness of 0.7 μm or greater or 4 μm or less. Resin films having an average thickness of 0.7 μm or greater are highly slidable with the metal films 2 and have high dielectric breakdown voltage. Resin films having an average thickness of 4 μm or less can increase capacitance.

The metal films 2 may include, for example, aluminum as a main component. The metal films 2 have an average thickness of, for example, 14 to 70 nm. The metal films 2 having a thickness (an average thickness) of 14 to 70 nm closely adhere to the dielectric layers 1 and are less breakable under tension applied to the metallized layers 5. The metal films 2 thus have a sufficient active area contributing to capacitance charging. The metal films 2 having an average thickness of 14 nm or greater are less likely to decrease capacitance at dielectric breakdown and increase the dielectric breakdown voltage. The metal films 2 having an average thickness of 70 nm or less remain self-healing and increase the dielectric breakdown voltage. The average thickness of the metal films 2 can be evaluated by observing cross sections of the metallized layers 5 processed by ion milling using, for example, a scanning electron microscope (SEM).

The metal films 2 may have a heavy-edge structure at least near the connection to the external electrodes 4. Near the connections to the external electrodes 4 is, in other words, near the first side surfaces 1e of the dielectric layers 1. The metal films 2 with the heavy-edge structure is, for example, thicker and less electrically resistant near the connections to the external electrodes 4 than in the active area 7 in which the first metal film 2a and the second metal film 2b overlap each other. The heavy-edged portions of the metal films 2 near the connections to the external electrodes 4 may be referred to as heavy-edge portions.

The film thickness of the metal films 2 near the connections to the external electrodes 4 is, for example, twice or more the film thickness for enabling self-healing, or more specifically 20 nm or greater. The film thickness of the metal films 2 in the heavy-edge portions may be 80 nm or less. The metal films 2 with the heavy-edge portions have improved electrical connection to the external electrodes 4. Additionally, the metal films 2 electrically connected to the external electrodes 4 with the less resistant heavy-edge portions can reduce the equivalent series resistance (ESR) of the stacked capacitor A.

The heavy-edge portions of the first metallized layers 5a overlap the insulation margins 6b of the second metallized layers 5b, and the heavy-edge portions of the second metallized layers 5b overlap the insulation margins 6a of the first metallized layers 5a. The heavy-edge portions may have a width of, for example, 0.5 mm or greater in the second direction y. The heavy-edge portions may have a width of 3 mm or less in the second direction y.

The film capacitor, or more specifically the stacked capacitor A, including resin films as the dielectric layers 1, may be fabricated in the manner described below. The dielectric layers 1 are first prepared. The dielectric layers 1 are obtained by, for example, preparing a resin solution in which an insulating resin is dissolved in a solvent, shaping the resin solution on the surface of a base film made of, for example, PET into a sheet, and drying the sheet to volatilize the solvent. The shaping method may be selected as appropriate from known film deposition methods including doctor blading, die coating, and knife coating. Examples of the solvent used for shaping include methanol, isopropanol, n-butanol, ethylene glycol, ethylene glycol monopropyl ether, methyl ethyl ketone, methyl isobutyl ketone, xylene, propylene glycol monomethyl ether, a propylene glycol monomethyl ether acetate, dimethylacetamide, cyclohexane, and an organic solvent containing a mixture of two or more solvents selected from the above solvents. In another example, a resin film formed by melt extrusion may be drawn.

The dielectric layers 1 may include the above insulating resin alone or may include other materials. The materials that may be included in the dielectric layers 1 other than resin include, for example, the above organic solvent and inorganic fillers. Example of the inorganic fillers include inorganic oxides such as alumina, titanium oxide, and silicon dioxide, inorganic nitrides such as silicon nitride, and glass. In particular, a material with a high relative dielectric constant such as a composite oxide having a perovskite structure may be used as an inorganic filler. In this case, the dielectric layer 1 has a higher relative dielectric constant in total and the stacked capacitor A can be smaller. The inorganic filler may be surface-treated by, for example, silane coupling or titanate coupling. The surface-treated inorganic filler is more compatible with the resin.

The dielectric layers 1 may be composite films containing less than 50 mass % of the above inorganic filler and 50 mass % or more than 50 mass % of resin. The dielectric layers 1 being composite films have a higher relative dielectric constant and other effects with the inorganic filler while remaining flexible as resin. The inorganic filler may have an average particle diameter of, for example, 4 to 1000 nm.

The resultant fabricated dielectric layers 1 are peeled off from the base film, and a metal component such as aluminum (Al) is deposited on one surface of each dielectric layer 1 by vapor deposition to form the metal films 2. This forms the metallized layers 5. The first slits 8 having a pattern may be formed on each metal film 2 by, for example, oil transfer patterning or laser patterning. In oil transfer patterning, each dielectric layer 1 is covered with an oil mask, and a metal component is deposited by vapor deposition. In laser patterning, a metal component is deposited on each dielectric layer 1 by vapor deposition, and the metal film 2 is then partially evaporated using a laser beam. The second slits 9 may be formed in the metal films 2 in the same manner.

The heavy-edge structure is formed by masking portions of the metallized layers 5 other than portions in which heavy-edge portions are to be formed as described above, and depositing, by vapor deposition, for example zinc (Zn) on the unmasked portions of the deposited metal component described above. The film to be deposited as the heavy-edge portions may have a thickness one to three times the thickness of the deposited metal component described above.

The first metallized layer 5a and the second metallized layer 5b are stacked on each other as a set with a slight deviation from each other in the width direction or the second direction y, and are wound around an annular winding core. The wound stack is cut in the second direction y to obtain the bodies 3 of stacked capacitors A. The annular winding core may also be referred to as a drum.

The external electrodes 4a and 4b are formed as metallic contact electrodes on the two end faces of each resultant body 3 in the second direction y or on the second side faces 3a and 3b to obtain the stacked capacitor A. For example, the external electrodes 4 may be formed by, for example, metal thermal spraying, sputtering, or plating. The external electrodes 4 may be formed before the stack is cut.

The outer surface of each resultant stacked capacitor A may be covered with an external package (not shown).

The external electrodes 4 may include metals such as Zn and alloys, other than Al described above.

The metallic contact electrodes may include at least one metal material selected from the group consisting of zinc, aluminum, copper, and solder.

Figure 10:
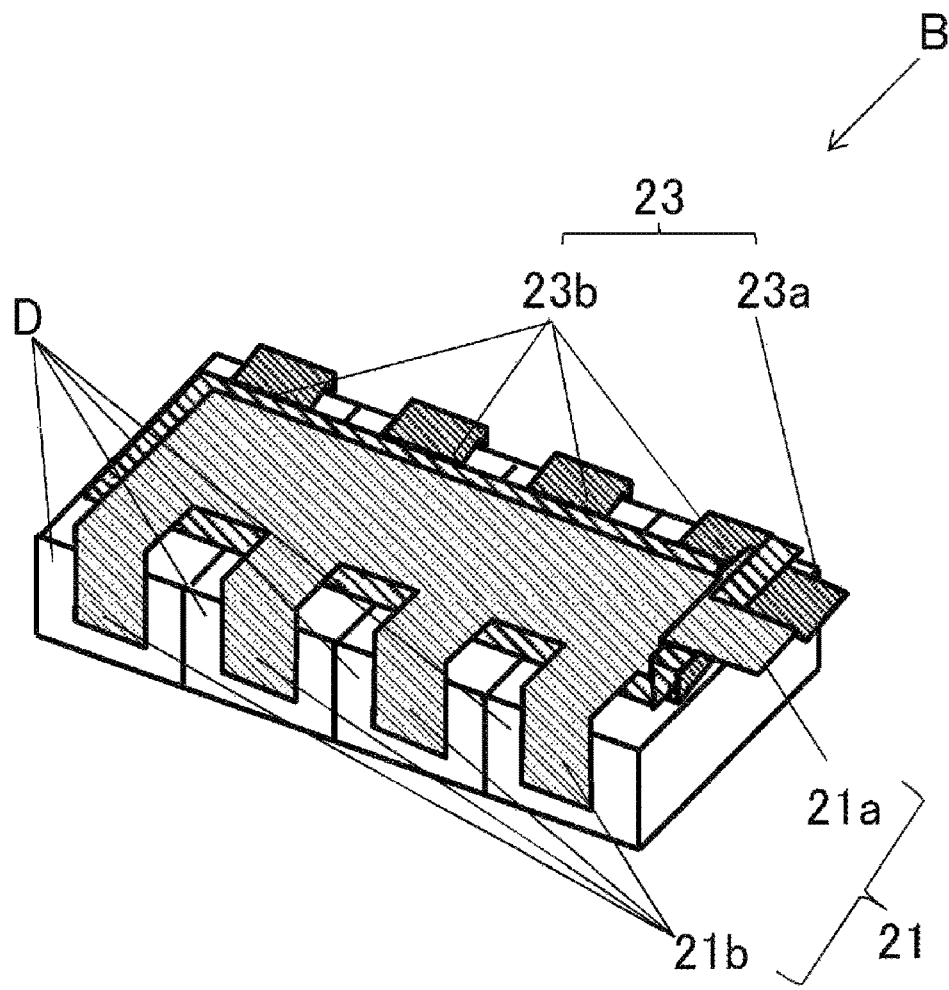
FIG. 10 is a schematic perspective view of a connected film capacitor in an example.

FIG. 10 is a schematic perspective view of a connected capacitor in an example. In FIG. 10, for ease of explanation, the external package covering the case and the surface of the capacitor is not shown. A connected capacitor B includes multiple capacitors D connected in parallel with a pair of busbars 21 and 23. The busbars 21 and 23 include terminals 21a and 23a for external connection and lead terminals 21b and 23b. The lead terminals 21b and 23b are connected to the external electrodes of the capacitors D.

The connected capacitor B including the stacked capacitors A as the capacitors D achieves high insulation.

The connected capacitor B may include at least one stacked capacitor A, and may include two or more stacked capacitors A. The connected capacitor B includes multiple capacitors D, for example four capacitors D as in FIG. 10, which are arranged side by side with the external electrodes on the two ends of each body connected to the busbars 21 and 23 with a bond.

The connected capacitor B may include the capacitors D arranged horizontally as shown in FIG. 10 or stacked vertically. The capacitors D may be arranged to have their external electrodes arranged vertically, or in the second direction y aligned with a vertical direction.

The capacitors D or the connected capacitor B may be placed in a case having a gap filled with resin to form a resin-molded capacitor or a case-molded capacitor.

Figure 11:
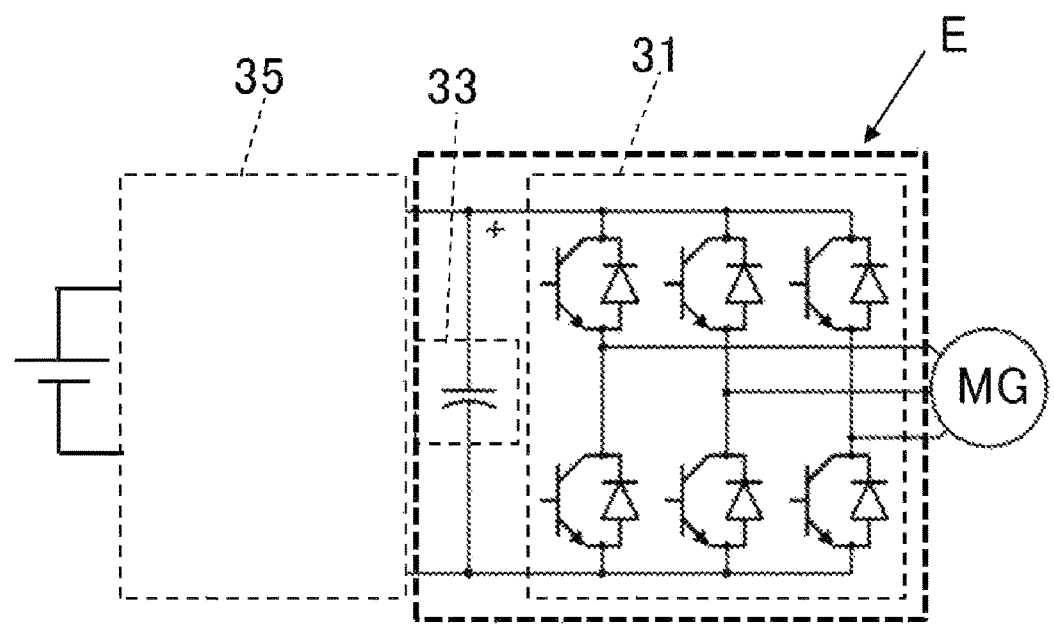
FIG. 11 is a schematic diagram of an inverter in an example.

FIG. 11 is a schematic diagram of an inverter in an example. FIG. 11 shows an inverter E that converts direct current to alternating current. As shown in FIG. 11, the inverter E includes a bridge circuit 31 and a capacitor 33. The bridge circuit 31 includes switching elements such as insulated gate bipolar transistors (IGBTs) and diodes. The capacitor 33 is located across the input terminals of the bridge circuit 31 to stabilize the voltage. The inverter E includes the stacked capacitor A as the capacitor 33.

The inverter E is connected to a booster circuit 35 that raises the voltage of a DC power supply. The bridge circuit 31 is connected to a motor generator MG as a drive source.

Figure 12:
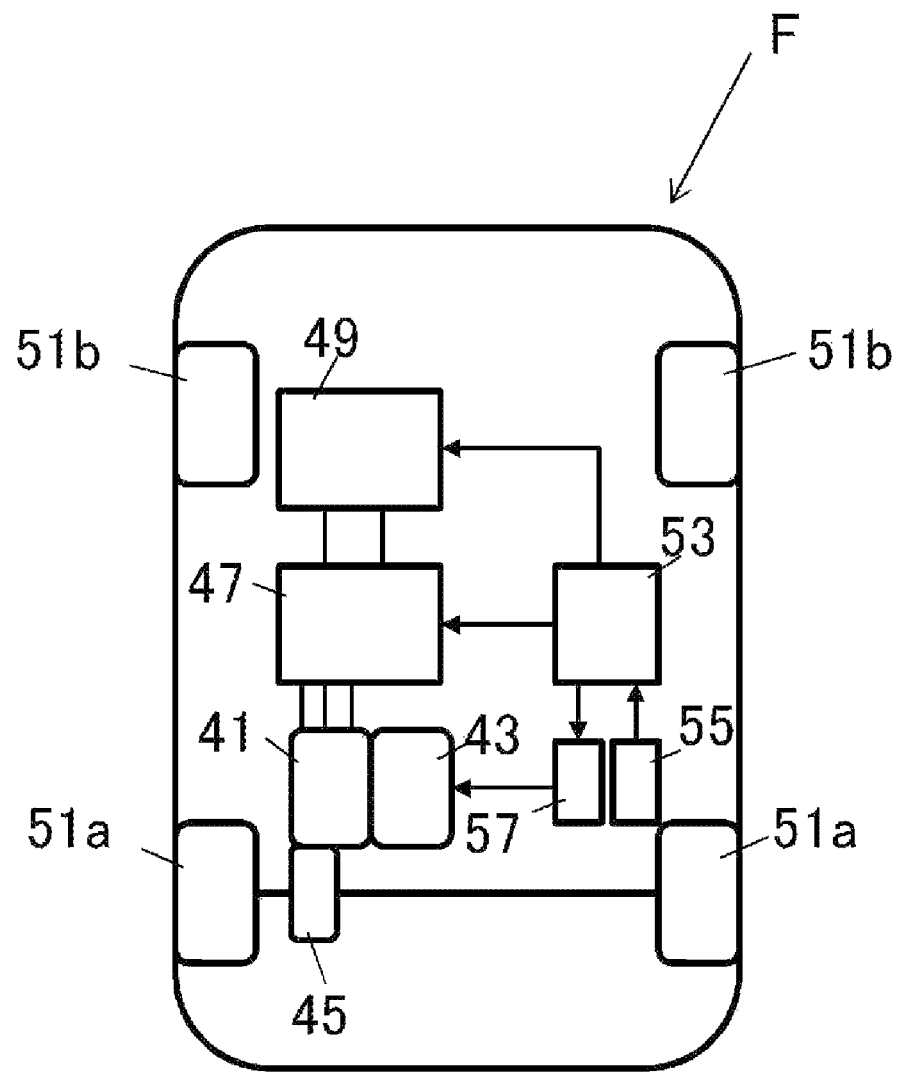
FIG. 12 is a schematic diagram of an electric vehicle in an example.

FIG. 12 is a schematic diagram of an electric vehicle. FIG. 12 shows a hybrid electric vehicle (HEV) as an example of the electric vehicle.

An electric vehicle F includes a driving motor 41, an engine 43, a transmission 45, an inverter 47, a power supply 49 or a battery 49, front wheels 51a, and rear wheels 51b.

The electric vehicle F includes an output unit, such as the motor 41, the engine 43, or both, as a drive source. The output from the drive source is transmitted to the pair of left and right front wheels 51a through the transmission 45. The power supply 49 is connected to the inverter 47, which is connected to the motor 41.

The electric vehicle F shown in FIG. 12 also includes a vehicle electronic control unit (ECU) 53 and an engine ECU 57. The vehicle ECU 53 centrally controls the entire electric vehicle F. The engine ECU 57 controls the rotation speed of the engine 43 and drives the electric vehicle F. The electric vehicle F further includes an ignition key 55 operable by, for example, a driver and driving components such as an accelerator pedal and a brake (not shown). The vehicle ECU 53 receives an input of a drive signal in response to an operation on a driving component performed by, for example, a driver. The vehicle ECU 53 outputs, based on the drive signal, an instruction signal to the engine ECU 57, the power supply 49, and the inverter 47 as a load. In response to the instruction signal, the engine ECU 57 controls the rotation speed of the engine 43 and drives the electric vehicle F.

The inverter 47 in the electric vehicle F includes the inverter E, which includes the stacked capacitor A as the capacitor 33. The electric vehicle F includes the stacked capacitor A that is highly insulating and has insulation resistance less likely to decrease. In a harsh environment such as in an engine part of the electric vehicle F, the stacked capacitor A can have insulation resistance less likely to decrease over a long period. The electric vehicle F thus allows more stable current control performed by controllers such as ECUs.

In addition to EHVs, the inverter E according to the embodiment is also applicable to various power converting products such as electric vehicles (EVs), fuel cell vehicles, electric bicycles, power generators, and solar cells.

EXAMPLES

A dielectric layer with an average thickness of 3 μm was prepared with polyarylate (U-100, Unitika). Polyarylate was dissolved in toluene, applied onto a base film made of polyethylene terephthalate (PET) using a coater, and shaped into a sheet. After shaping, the sheet was heat-treated at 130° C. to remove toluene to form a dielectric layer.

The dielectric layer was peeled off from the base film and slit into strips each with a width of 200 or 130 mm. A metal film was then formed on one surface of the dielectric layer by vacuum deposition.

The dielectric layer with a width of 200 mm was coated with a metal film in the manner described below. First, the surface of the dielectric layer opposite to the surface previously facing the base film was covered with an oil mask. An Al metal film with a width of 52 mm was formed in the middle of the dielectric layer in the width direction or the first direction x. The average thickness of the Al metal film is 20 nm. Subsequently, using a metal mask, a Zn metal film with a width of 8.8 mm was formed in the middle of the Al metal film in the width direction as a heavy-edge portion. The average thickness of the Zn metal film is 40 nm.

The middle portion and the two ends in the width direction of the dielectric layer with the metal films were slit into a metallized layer with a width of 28 mm. The width of an insulation margin of the resulting metallized layer is 1 mm, and the width of the heavy-edge portion is 4.4 mm. The heavy-edge portion of the metallized layer is a continuous metal film.

Figure 13:
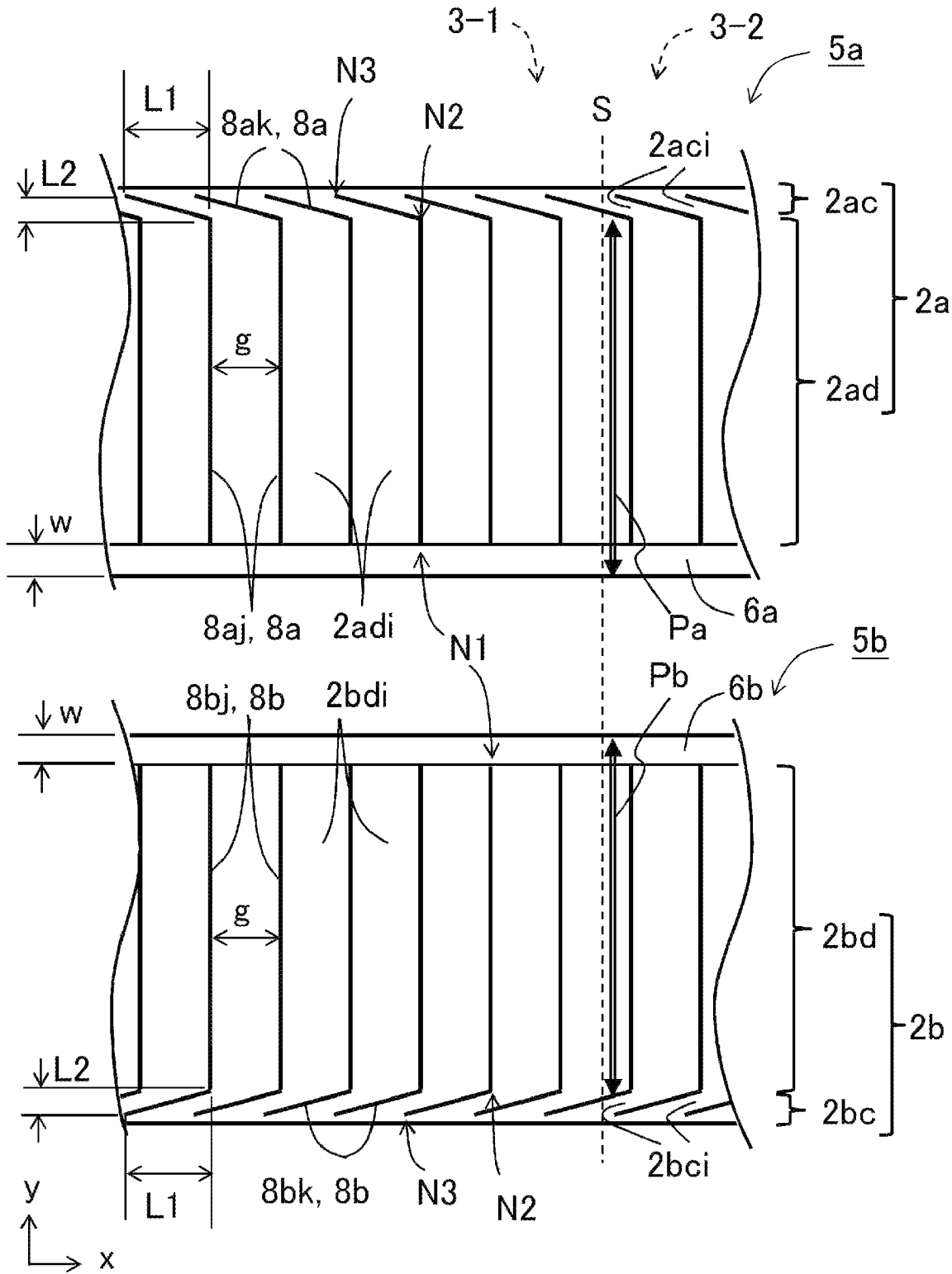
FIG. 13 is a plan view of a first metal film and a second metal film used in an example, showing their arrangement.
Figure 14:
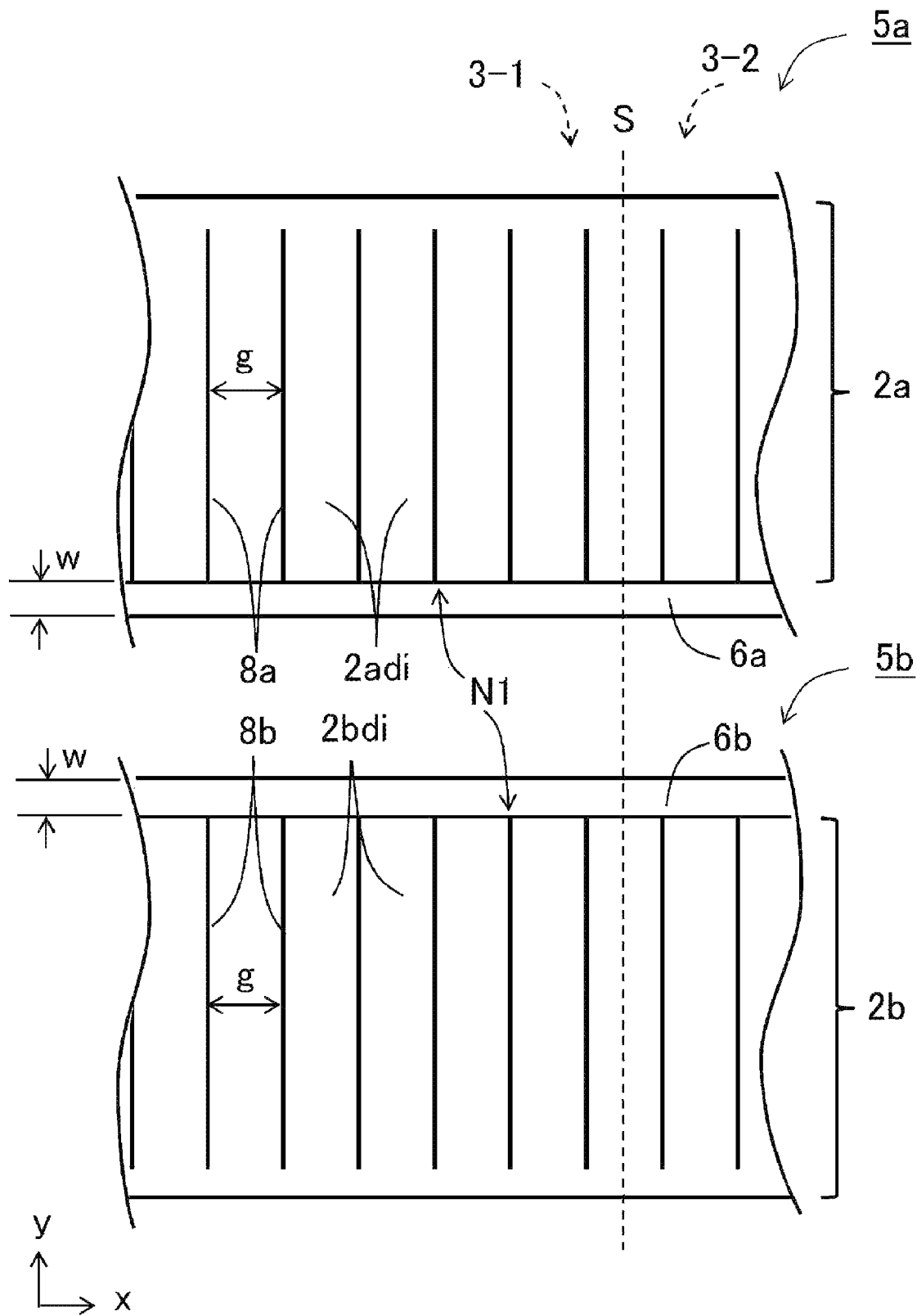
FIG. 14 is a plan view of a first metal film and a second metal film used in an example, showing their arrangement.

As shown in Table 1, the first slits 8 shown in one of FIG. 5, 13, or 14 were formed in each sample Al metal film using an oil mask. In FIG. 5, the lengths La1 and Lb1 are equal, the length La2 and Lb2 are equal, and the widths wa and wb are equal. In Table 1 and FIG. 13, L1 indicates the lengths La1 and Lb1, and L2 indicates the lengths La2 and Lb2. In Table 1 and FIGS. 13 and 14, w indicates the widths wa and wb. The width of the first slit is 0.2 mm, with g indicating the interval between adjacent first slits, or more specifically the interval between the centers of the widths of the adjacent slits.

In FIG. 5, as described above, the second portion of each first slit in the first metal film extends from the second end to the third end in a direction opposite to the direction in which the second portion of each first slit in the second metal film extends from the second end to the third end. In FIG. 13, the second portion of each first slit in the first metal film extends from the second end to the third end in the same direction as the second portion of each first slit in the second metal film extends from the second end to the third end. In FIG. 14, each first slit includes the first portion alone without the second portion.

A first metallized layer and a second metallized layer were stacked on each other with their heavy-edge portions located oppositely in the first direction x and protruding in the second direction y by 0.5 mm. The stacked first and second metallized layers were wound 450 times on a drum with a diameter of 200 mm to obtain a roll including multiple film capacitors connected annularly. The first metallized layer and the second metallized layer were stacked to have the dielectric layer between the first metal film and the second metal film.

The resultant roll was cut into stacks to be bodies with a width of 50 mm in the second direction y. Zn was arc sprayed onto the two ends of each resultant body at which the first metal film and the second metal film were exposed or onto the second (first) side face of each body, forming metallic contact electrodes as external electrodes. This completes fabrication of stacked film capacitors.

The capacitance, the dielectric loss (dissipation factor DF), and the withstand voltage of each fabricated stacked film capacitor were measured. The capacitance and the dielectric loss (DF) were measured using an LCR meter at 1 VAC and 1 kHz. The withstand voltage was evaluated by applying a DC voltage of 0 to 900 V to the stacked film capacitors using an insulation resistance meter. In the test, a DC voltage of 0 to 900 V was applied to the stacked film capacitors at a boosting rate of 10 V per second. The voltage at which the leakage current reached 0.01 A was determined as the withstand voltage of the stacked film capacitors.

TABLE 1

| Sample No. | Metal film | g mm | w mm | L1 mm | L2 mm | Capacitance μF | Dielectric loss DF % | Withstand voltage V |
|---|---|---|---|---|---|---|---|---|
| 1 | FIG. 5 | 2.0 | 1.0 | 2.2 | 0.8 | 7.0 | 0.42 | >900 |
| 2 | FIG. 5 | 2.0 | 1.0 | 2.2 | 1.2 | 7.0 | 0.41 | 900 |
| 3 | FIG. 5 | 2.0 | 1.0 | 2.0 | 0.8 | 7.0 | 0.41 | 900 |
| 4 | FIG. 13 | 2.0 | 1.0 | 2.2 | 0.8 | 7.0 | 0.42 | 350 |
| 5 | FIG. 14 | 2.0 | 1.0 | 0 | 0 | 7.1 | 0.40 | 300 |

For samples 1 to 3, the length L1 is greater than or equal to the interval g, and the directions in which the second portions of the first slits in the first metallized layer extend and those in the second metallized layer extend are opposite. Samples 1 to 3 each show high insulation at the cut surface and a leakage current of 0.01 A or less under an applied DC voltage of 900 V.

Sample 4 has the same structure as sample 1 except that the second portions of the first slits in the first metallized layer and those in the second metallized layer extend in the same direction. Sample 4 shows a lower withstand voltage. Sample 5, with each first slit including the first portion alone without the second portion, shows a lower withstand voltage.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present invention.

REFERENCE SIGNS LIST

A stacked capacitor
B connected capacitor
D capacitor
E inverter
F electric vehicle
1, 1a, 1b dielectric layer
2 metal film
2a, 2a1, 2a2 first metal film 2b second metal film
2c, 2ac, 2bc metal film edge
2ci second sub-film
2d, 2ad, 2bd portion in an active area
2di first sub-film
3 body
3a, 3b second side face
3c, 3d first side face
4, 4a, 4b external electrode
5, 5a, 5b metallized layer
6 insulation margin
6a, 6a1, 6a2 first insulation margin
6b second insulation margin
7 active area
8 first slit
8j, 8aj, 8bj first portion
8k, 8ak, 8bk second portion
21, 23 busbar
31 bridge circuit
33 capacitor
35 booster circuit
41 motor
43 engine
45 transmission
47 inverter
49 power supply
51a front wheel
51b rear wheel
53 vehicle ECU
55 ignition key
57 engine ECU

The invention claimed is:

1. A stacked capacitor, comprising:
a body being a rectangular prism including one or more stacks each including a dielectric layer, a first metal film, and a second metal film, the first metal film and the second metal film facing each other across the dielectric layer; and
external electrodes on surfaces of the body,
wherein the body has a pair of opposing faces located in a thickness direction of the dielectric layer, a pair of opposing first side faces connecting the pair of opposing faces, and a pair of opposing second side faces receiving the external electrodes,
the first side faces are located in a first direction, and the external electrodes are located in a second direction,
the body includes an active area in which the first metal film and the second metal film overlap each other across the dielectric layer, a first insulation margin in which a portion without the first metal film extends continuously in the first direction, and a second insulation margin in which a portion without the second metal film extends continuously in the first direction,
the first metal film includes a metal film edge in the second insulation margin, and the second metal film includes a metal film edge in the first insulation margin,
the first metal film includes a plurality of sub-films separated from one another by a plurality of first slits, and the second metal film includes a plurality of sub-films separated from one another by a plurality of first slits,
a first slit of the plurality of first slits includes a first portion extending from the first insulation margin or the second insulation margin along the first side faces and across the active area and a second portion located in the metal film edge and extending at an angle with the first side faces,
the second portion has a length in the first direction greater than or equal to an interval between adjacent first slits of the plurality of first slits, and
the second portion at the metal film edge of the first metal film extends from a first end of the second portion connecting with the first portion to a second end in a direction opposite to a direction in which the second portion at the metal film edge of the second metal film extends from a first end of the second portion connecting with the first portion to a second end.

2. The stacked capacitor according to claim 1, wherein the length of the second portion in the first direction is three times or less than three times the interval between the adjacent first slits.

3. The stacked capacitor according to claim 1, wherein the second portion has a length in the second direction less than a width of the first insulation margin or the second insulation margin in the second direction.

4. The stacked capacitor according to claim 1, wherein the dielectric layer includes a resin film.

5. A connected capacitor, comprising:
a plurality of capacitors; and
a busbar electrically connecting the plurality of capacitors,
wherein the plurality of capacitors include the stacked capacitor according to claim 1.

6. An inverter, comprising:
a bridge circuit including a switching element; and
a capacitor connected to the bridge circuit, the capacitor including the stacked capacitor according to claim 1.

7. An electric vehicle, comprising:
a power supply;
an inverter connected to the power supply;
a motor connected to the inverter; and
a wheel drivable by the motor,
wherein the inverter includes the inverter according to claim 6.

* * * * *